United States Patent [19]

Deregibus

[11] Patent Number: 4,526,640

[45] Date of Patent: Jul. 2, 1985

[54] EQUIPMENT FOR PRODUCING CONTINUOUS TAPE OF RUBBERY VULCANIZABLE MATERIAL FOR THE MANUFACTURE OF HOSE ARTICLES

[75] Inventor: Alfio Deregibus, Padua, Italy

[73] Assignee: The Goodyear Tire & Rubber Company, Akron, Ohio

[21] Appl. No.: 199,171

[22] Filed: Oct. 22, 1980

Related U.S. Application Data

[60] Continuation of Ser. No. 53,169, Jun. 29, 1979, abandoned, which is a division of Ser. No. 841,790, Oct. 13, 1977, Pat. No. 4,173,444.

[30] Foreign Application Priority Data

Apr. 5, 1977 [IT] Italy .................................. 23157 A/77

[51] Int. Cl.³ .......................... B29B 19/00; C09J 5/02; C09J 5/00
[52] U.S. Cl. ................................. 156/242; 156/307.7; 156/311; 156/324; 425/DIG. 235
[58] Field of Search ................... 156/242, 555, 244.11, 156/244.24, 244.27, 244.26, 289, 298, 307.7, 311, 279, 224; 264/498, 555, 582, 175; 165/89; 425/363, DIG. 235

[56] References Cited

U.S. PATENT DOCUMENTS

| | | | |
|---|---|---|---|
| 1,785,083 | 12/1930 | Haertel | 264/130 |
| 2,054,115 | 9/1936 | Abrams | 264/175 |
| 2,524,375 | 10/1950 | Campbell | 264/175 |
| 2,938,236 | 5/1960 | Robb | 264/175 |
| 3,741,844 | 6/1973 | Schwartz | 156/244.27 |
| 4,008,352 | 2/1977 | Dawes et al. | 156/311 |
| 4,130,453 | 12/1978 | Hollister | 156/498 |

Primary Examiner—Edward Kimlin
Assistant Examiner—L. Falasco
Attorney, Agent, or Firm—R. D. Thompson; William A. Drucker

[57] ABSTRACT

A method for continuously producing tapes in rubbery vulcanizable material, adapted to the manufacture of hoses, includes causing a rubbery composition to pass and be calendered into a tape between rollers, cooling the calendered tape on a set of internally cooled hollow cylinders adding an anti-adherent powder, and slitting the tape longitudinally into a plurality of narrower tape portions.

4 Claims, 4 Drawing Figures

U.S. Patent
Jul. 2, 1985
4,526,640
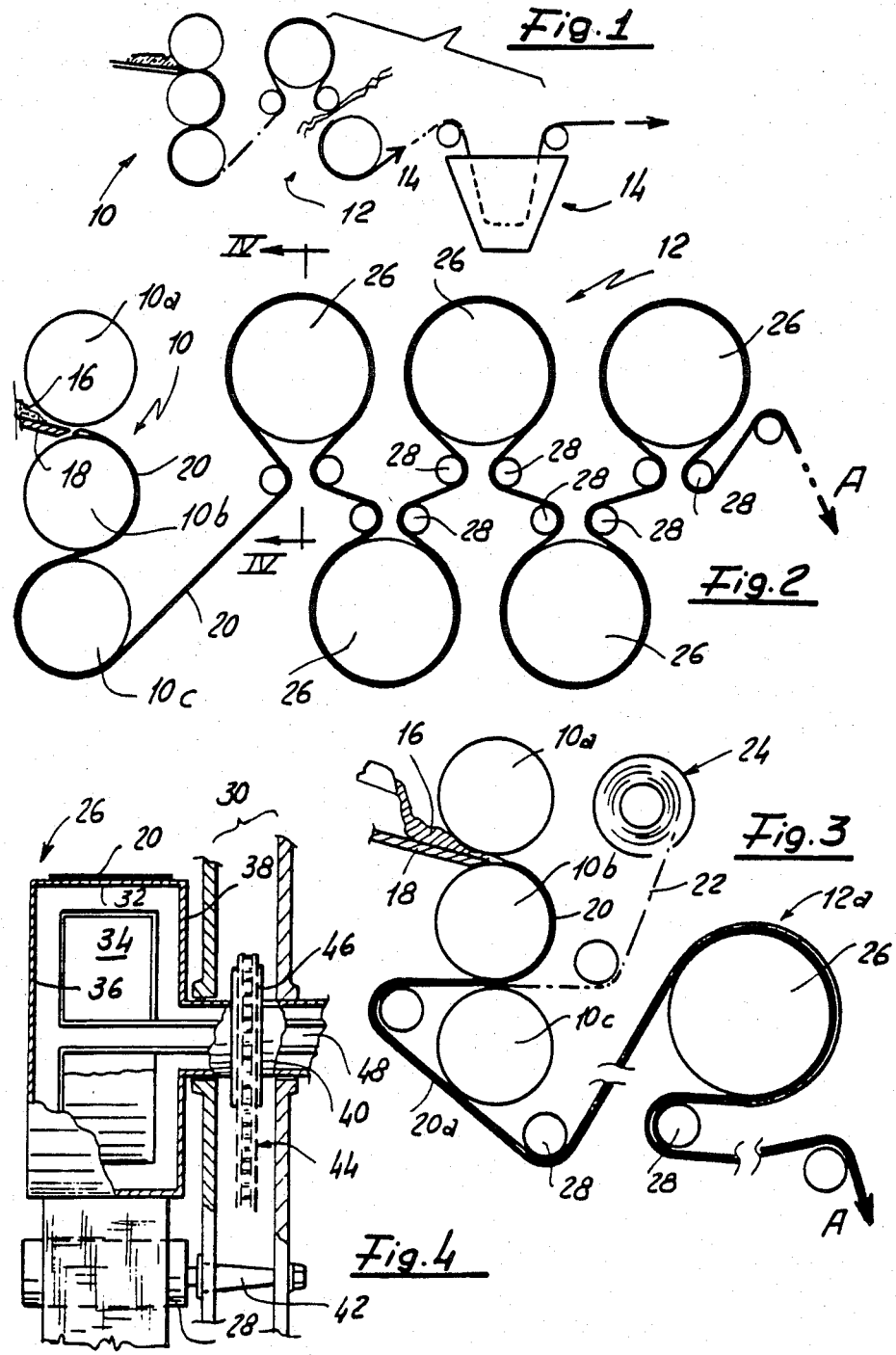

4,526,640

EQUIPMENT FOR PRODUCING CONTINUOUS TAPE OF RUBBERY VULCANIZABLE MATERIAL FOR THE MANUFACTURE OF HOSE ARTICLES

This is a continuation of Ser. No. 053,169 filed June 29, 1979 abandoned which is a division of Ser. No. 841,790 filed 10/13/77 now U.S. Pat. No. 4,173,444.

BACKGROUND OF THE INVENTION

FIELD OF THE INVENTION

This invention relates to a method for the industrial production of tapes, in particular for the formation or manufacture of hose, in natural or synthetic rubber, which can be vulcanized, and for their arrangement into the formation of bobbins of the said tapes.

SUMMARY OF THE INVENTION

The method of this invention is characterised by including, in general, steps of calandering the amorphous mass of raw rubber, or of vulcanizable elastomeric material, to reduce it to the form of a tape, progressively coating the tape in order to give it the required consistency, treating the surfaces of the said tape with zinc stearate, or other equivalent anti-adhesive product for raw rubber with a high covering capacity, and passing the treated tape to the means which carry out the longitudinal cutting of the initial, wide continuous tape into two or more narrower tapes, suitable for the specific use of the article, and thereafter winding into bobbins.

These and other specific characteristics of the method, together with the main industrial advantages which result from the application of the above described inventive concepts, will be better understood in the course of the following detailed description, related to the drawings:

BRIEF DESCRIPTION OF THE DRAWINGS

FIG. 1 shows, schematically and in side view, the essential components,

FIG. 2 shows, in greater detail, an operative unit in accordance with the invention, for the production of continuous tapes in raw rubber, either natural or synthetic;

FIG. 3 shows a variation, for the production of tapes by coating a fabric tape with rubber, or by coupling a laminated or calandered rubber layer with fabric, and FIG. 4 shows a component of the continuous cooling system of the tape, seen in action at IV—IV of FIG. 3.

DESCRIPTION OF THE PREFERRED EMBODIMENTS

With reference to FIG. 1, this equipment comprises a sequence of devices including a forming and calandering system 10 for the production of a wide tape of raw rubber, or of a mixture based on natural or synthetic rubber, which can be vulcanized, a cooling system 12 and, finally, a system 14 for the application of zinc stearate, or equivalent covering anti-adhesive material, in powder form. These anti-adhesive products prevent the mutual adhesion between the superimposed windings of the bobbins in which the tape is packed. These materials are chosen, based on technical knowledge, for their compatibility with raw rubber and their associability with it, during the vulcanizing treatment, as well as for their high covering capacity, which permit the formation of a very thin interlayer of anti-adhesive between the said windings, even though with proportionally very small quantities of the product.

As can be better observed in FIG. 2, system 10 comprises three calandering cylinders 10a, 10b and 10c. Cylinders 10a and 10b form a first couple through which the amorphous mixture of raw rubber 16, brought forward along presenting belt 18, is transformed into a rubber tape 20, which is then calandered and reduced to the necessary thickness around the second couple formed by the same cylinder 10b and the following cylinder 10c.

In the case of the production of "linenized" rubber tapes, or more exactly rubberized fabric tapes or tapes coated and then coupled with a layer of rubber 20a, the forming system can be arranged as shown in FIG. 3. In this case the rubber tape 20, produced by calandering between cylinders 10a and 10b, is coupled, during its passage between cylinders 10b and 10c to a fabric 22, coming, from a bobbin 24, so as to form a compound tape 20a to send to the cooling system, schematically reproduced and indicated as 12a, the whole as can be seen in FIG. 3, and in which the cooling is carried out by means of temporary contraposition of the rubberized surfaces of the said compound tape 10a, with cooling surfaces.

The cooling system 12 (or 12a) comprises at least one plain cooling cylinder, in general a number of cooling cylinders, each one indicated as 26 in FIGS. 2 and 3, around which the tape 20 (or 20a) follows a path, determined by the return rollers 28, including arcs as near as possible to 360° of contact with the surface of the said cylinders, before being sent, in direction A, to the said system 14.

These cooling cylinders 26, as well as the return rollers 28 are rotatively supported by a cantilever, as indicated in FIG. 4, by a supporting structure arranged on only one side of the battery of said cylinders and rollers. In this way, the advancing material is accessible at every point. This technical solution is very advantageous both for control and for any intervention necessary of the advancing material and also, mainly, for the starting of the machine, in the course of which this material can be inserted and positioned in the path desired.

As said above, the cooling cylinders 26 present a cylindrical surface of axial dimensions greater, than the width of the tape 20 (or 20a) to be cooled. This surface is the perimetrical part 32 of a metallic drum (at least in the said perimetrical part) whose internal volume is largely occupied by an internal drum 34, of such a size as to form, together with the external drum, air spaces adjacent to both the said perimetrical part and to both the heads 36 and 38 of the external drum.

This double drum has a cantilever support by a hollow shaft 40, as shown in FIG. 4, rotatively supported by the said structure 30, by means of a pair of bearings suitably spaced to resist loads resulting from the cantilever support of the drum as well as stresses due to the presence and the advancement of the tape material 20 (or 20a).

While the return rollers 28 could also be substituted by pivots 42, also projecting and supported by structure 30, the cooling cylinders 26 are mechanically operated, by motor and transmission means whose driven components are exemplified by a transmission chain 44 meshing with a toothed wheel chain 46, joined to the said shaft. All the cylinders of the complex 12 (or 12a) are operated with equal rim speeds (or better, with a rim velocity proportional to the diameter of the said cylinders) in such a way as to impose a constant traversing speed on the tape material 20 (or 20a). Furthermore, it is also possible to make the linear velocity of the advancing material different in various points of its path, for example to control elongation.

Moreover it is preferable that the cooling drums be operated by motors with varying speeds, or connected to variators, in order to give the plant flexibility to adapt to different positions, in relation to the velocity of the tape material fed in and out of the molder system 10.

FIG. 4 also exemplifies the characteristic technical solutions preferred for the absorption and dissipation of the heat of the tape material 20 (or 20a). The cooling cylinder (or cylinders) 28 are cooled by means of circulation of a coolant, for example water, which is made to circulate in the said air spaces, through entry and exit ducts formed by the same shaft 40. This hollow shaft includes inside a second tubular shaft 48, in such a way that the said ducts are formed by the inside of this latter and respectively by the air space existing between it and the tubular shaft 40. As can be observed in FIG. 4, these ducts open, on the inside of the respective cooling cylinder 26, in correspondence of the air space adjacent to respectively one and to the other of the heads 36 and 38 of the external drum, in such a way that the circulating coolant is obliged to lap against the internal surface of the said perimetrical part 32, of the cooling cylinder, absorbing heat from every point of this perimetrical part, in contact with the tape material. The equipment could be completed with suitable command and control devices, in particular with thermostatic means for regulating the temperature of the coolant, tensiometers for controlling the tension of the advancing tape material, these means piloting, by means of known preferred systems connected to a central command box, the feeding of the coolant and respectively the velocities of the driving motors and/or variators and so forth.

I claim:

1. A method for the continuous production of running lengths of vulcanized compound reinforced tape for use in the making of a hose product, comprising a first step of passing amorphous vulcanizable rubber material at a high temperature, suitable for calendering of that material, through a first calender nip formed between heated counter-rotatable rolls of a first calender to form said material into a tape, a second step of thereafter passing said tape and preselected fabric material through a second calender nip formed between heated counterrotatable rolls of a second calender to reduce the tape to a predetermined thickness and form a compound tape, and thereafter a third and separate step of plural and successive stages of cooling said compound tape by passing it in conductive cooling contact with a respective major arcuate portion of an exterior cooling cylindrical surface of each of a series of rotatable cooling cylinders, said major arcuate portions of said series of cylinders being contacted alternately by first and second faces of the compound tape continuously laminating said tape and said fabric in said-calender means to form a compound reinforced tape and, after cooling said tape, vulcanizing said cooled tape to provide a vulcanized compound reinforced tape.

2. The method claimed in claim 1 including the step of passing a flow of coolant fluid through an internal cooling circuit including at least one passage contiguous to a cylindrical wall of a plain said cooling cylinder having said exterior cylindrical surface, said passage having inlet and outlet means connected thereto at one axial end only of said cylinder.

3. The method claimed in claim 1 including the step of passing a flow of coolant fluid through a respective passage defined between each of the series of cooling cylinders and a respective displacement drum disposed coaxially internally of each said cooling cylinder, said annular passage being of axial width at least equal to the transverse width of said tape.

4. The method claimed in claim 1 comprising the further step of guiding said compound tape to and from contact with each said cooling cylinder by means of a respective pair of rotatably mounted guide rolls associated with each said cooling cylinder.

* * * * *